(12) United States Patent
Wolf et al.

(10) Patent No.: US 7,521,897 B2
(45) Date of Patent: Apr. 21, 2009

(54) BATTERY CHARGE TEMPERATURE CONTROL

(75) Inventors: Mats Wolf, Södra Sandby (SE); Jan-Olof Svensson, Kivik (SE)

(73) Assignee: Sony Ericsson Mobile Communications AB, Lund (SE)

( * ) Notice: Subject to any disclaimer, the term of this patent is extended or adjusted under 35 U.S.C. 154(b) by 360 days.

(21) Appl. No.: 11/388,981

(22) Filed: Mar. 27, 2006

(65) Prior Publication Data
US 2007/0222419 A1 Sep. 27, 2007

(51) Int. Cl.
*H02J 7/04* (2006.01)
*H02J 7/16* (2006.01)

(52) U.S. Cl. ...................................... 320/150
(58) Field of Classification Search ................ 320/106, 320/112, 119, 128, 132, 134, 135, 136, 150, 320/152; 324/426, 427, 433, 434; 702/63
See application file for complete search history.

(56) References Cited

U.S. PATENT DOCUMENTS

| | | | | |
|---|---|---|---|---|
| 5,206,578 A | * | 4/1993 | Nor | 320/118 |
| 5,493,199 A | * | 2/1996 | Koenck et al. | 320/106 |
| 5,557,188 A | * | 9/1996 | Piercey | 320/134 |
| 5,610,499 A | * | 3/1997 | Rogers | 322/25 |
| 5,831,350 A | * | 11/1998 | McConkey et al. | 307/150 |
| 6,064,179 A | * | 5/2000 | Ito et al. | 320/128 |
| 6,111,389 A | * | 8/2000 | Aranovich et al. | 320/150 |
| 6,777,915 B2 | * | 8/2004 | Yoshizawa et al. | 320/137 |
| 2002/0036482 A1 | * | 3/2002 | Nakatsuji | 320/152 |
| 2002/0113574 A1 | * | 8/2002 | Mashiko | 320/128 |

FOREIGN PATENT DOCUMENTS

| | | |
|---|---|---|
| EP | 0 379 221 A2 | 7/1990 |
| EP | 0 939 474 A2 | 9/1999 |
| EP | 1 100 169 A2 | 5/2001 |
| JP | 10-145981 A | 5/1998 |

OTHER PUBLICATIONS

Chester Simpson; "Battery Charging"; National Semiconductor; Feb. 23, 2006 (print date); 17 pages.
Philips Semiconductors; "AN10338—Off-line Li-Ion Battery Charger with P89LPC916"; www.semiconductors.philips.com; Nov. 19, 2004; 26 pages.
International Search Report and Written Opinion dated Jun. 29, 2007.
International Preliminary Report on Patentability dated Jul. 8, 2008 issued in corresponding international application No. PCT/IB2006/002677, 10 pages.

* cited by examiner

*Primary Examiner*—Akm E Ullah
*Assistant Examiner*—M'Baye Diao
(74) *Attorney, Agent, or Firm*—Harrity & Harrity, LLP (57) ABSTRACT

A system for charging a rechargeable battery supplies a current to the battery to charge the battery. The system determines a temperature associated with the battery and identifies a cutoff parameter based on the determined temperature. The system determines when the supplied current matches a value corresponding to the cutoff parameter and stops further supply of the supplied current to the battery when the supplied current matches the value corresponding to the current cutoff parameter.

19 Claims, 9 Drawing Sheets

FIG. 2

| TEMP | CUTOFF CURRENT |
|---|---|
| 25 °C | 50 mA |
| 45 °C | 200 mA |
| 60 °C | 400 mA |

BATTERY CHARGE TEMPERATURE CONTROL

TECHNICAL FIELD OF THE INVENTION

Implementations described herein relate generally to rechargeable batteries and, more particularly, to charge temperature control of a battery.

DESCRIPTION OF RELATED ART

Charging rechargeable batteries requires various levels of control in order to obtain and maintain the desired performance level. Various techniques to control charging exist today. One such technique includes a constant current phase followed by a constant voltage phase. During the constant current phase, the battery charger supplies a maximum charging current to the battery. Once the battery voltage reaches a predetermined level (sometimes referred to as the "set-point voltage" level), the constant voltage phase begins. During the constant voltage phase, the battery charger reduces the charging current to an amount necessary to maintain the battery voltage at the predetermined level.

Battery charge control becomes particularly important for products that can be exposed to a wide range of temperature, such as portable devices (e.g., mobile phones, laptops, personal digital assistants (PDAs), etc.). High temperature and high voltage levels accelerate battery performance degradation. Existing charge control systems tend to be complex and costly.

SUMMARY

According to one aspect, a device may include a temperature monitor and a voltage charger. The temperature monitor may determine a temperature associated with a rechargeable battery. The voltage charger may determine a current cutoff parameter based on the determined temperature, supply current to the battery, determine when the supplied current reaches a value corresponding to the current cutoff parameter, and cease further supply of the supplied current to the battery when the supplied current reaches the value corresponding to the current cutoff parameter.

Additionally, the temperature monitor may include a thermistor.

Additionally, the device may further include a table that may further include multiple entries, where each of the entries may store a temperature parameter and a current cutoff parameter.

Additionally, when determining a current cutoff parameter, the voltage charger may match the determined temperature to the temperature parameter associated with one of the entries in the table, and identify the current cutoff parameter that corresponds to the temperature parameter in the one of the entries.

Additionally, the device may further include multiple tables that may each include multiple entries, where each of the entries may store a temperature parameter and a current cutoff parameter, and each of the tables may correspond to a battery type or a battery manufacturer.

Additionally, one of the tables may be selected based on the battery type or the battery manufacturer associated with the battery. The voltage charger may identify the current cutoff parameter from the selected table.

Additionally, when ceasing further supply of the supplied current, the voltage charger may less than fully charge the battery.

Additionally, the battery may include a lithium ion battery or a lithium polymer battery.

According to another aspect, a method for charging a rechargeable battery is provided. The method may include supplying a current to the battery to charge the battery; determining a temperature associated with the battery; identifying a cutoff parameter based on the determined temperature; determining when the supplied current matches a value corresponding to the cutoff parameter; and stopping further supply of the supplied current to the battery when the supplied current matches the value corresponding to the current cutoff parameter.

Additionally, the method may further include storing a table that includes multiple entries, where each of the entries may store a temperature parameter and a current cutoff parameter.

Additionally, identifying a cutoff parameter may include matching the determined temperature to the temperature parameter associated with one of the entries in the table, and determining the cutoff parameter as the current cutoff parameter that corresponds to the temperature parameter in the one of the entries.

Additionally, the method may further include storing multiple tables that may each include multiple entries, where each of the entries may store a temperature parameter and a current cutoff parameter, and each of the tables may correspond to a battery type or a battery manufacturer.

Additionally, identifying a cutoff parameter may includes selecting one of the tables based on the battery type or the manufacturer associated with the battery, and determining the cutoff parameter as one of the current cutoff parameters from the selected table.

Additionally, stopping further supply of the supplied current to the battery may include ceasing further supply of the supplied current before the battery is fully charged.

According to yet another aspect, a device may comprise means for storing multiple sets of temperature parameters and current cutoff parameters, where each of the sets may include one of the temperature parameters and a corresponding one of the current cutoff parameters; means for determining a temperature associated with a battery; means for comparing the determined temperature to the temperature parameters in at least one of the sets to identify one of the temperature parameters; means for identifying the current cutoff parameter corresponding to the identified temperature parameter; means for supplying current to the battery; means for determining when the supplied current matches the identified current cutoff parameter; and stopping further supply of the supplied current to the battery when the supplied current matches the identified current cutoff parameter.

According to a further aspect, a device may include multiple tables, a temperature monitor, and a voltage charger. Each of the tables may store a plurality of sets of temperature parameters and current cutoff parameters. Each of the sets may include one of the temperature parameters and a corresponding one of the current cutoff parameters. The temperature monitor may determine a temperature associated with a rechargeable battery. The voltage charger may compare the determined temperature to the temperature parameters in one of the tables to identify one of the temperature parameters, identify the current cutoff parameter corresponding to the identified temperature parameter, supply current to the battery, determine when the supplied current matches the identified current cutoff parameter, and cease further supply of the supplied current to the battery when the supplied current matches the identified current cutoff parameter.

Additionally, each of the tables may be associated with a different battery type or manufacturer of batteries.

Additionally, one of the tables may be selected based on the battery type or the manufacturer associated with the battery.

Additionally, when ceasing further supply of the supplied current, the voltage charger may less than fully charge the battery.

Additionally, the battery may include a lithium ion battery or a lithium polymer battery.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION OF EMBODIMENTS

The following detailed description of the invention refers to the accompanying drawings. The same reference numbers in different drawings may identify the same or similar elements. Also, the following detailed description does not limit the invention.

The description to follow will describe a mobile device. As used herein, a "mobile device" may include a radiotelephone; a personal communications system (PCS) terminal that may combine a cellular radiotelephone with data processing, a facsimile, and data communications capabilities; a personal digital assistant (PDA) that can include a radiotelephone, pager, Internet/intranet access, web browser, organizer, calendar, and/or global positioning system (GPS) receiver; a laptop; or another portable computation or communication device.

Exemplary Mobile Device

Figure 1:
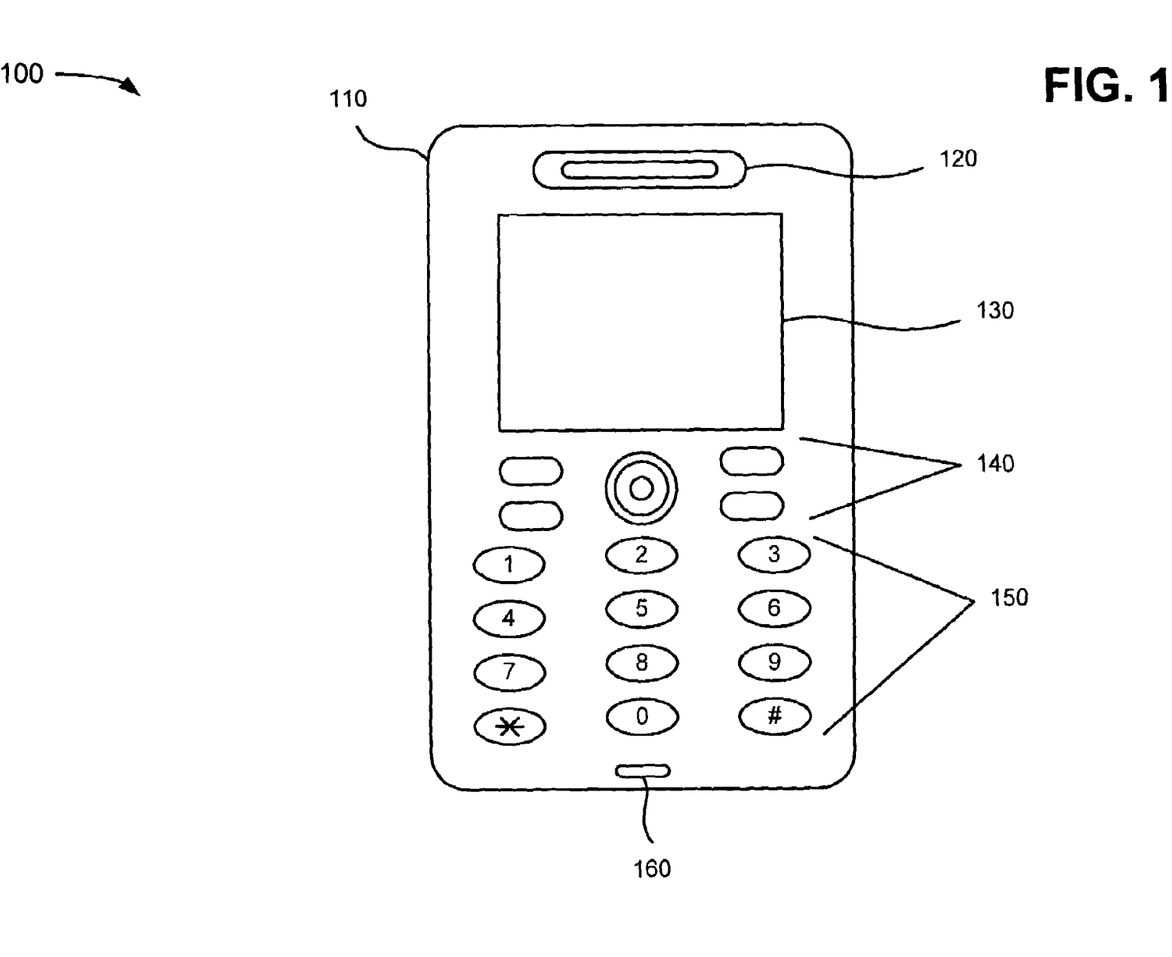
FIG. 1 is a diagram of an exemplary device according to an implementation consistent with the principles of the invention.

FIG. 1 is a diagram of an exemplary mobile device 100 according to an implementation consistent with the principles of the invention. As shown in FIG. 1, device 100 may include a housing 110, a speaker 120, a display 130, control buttons 140, a keypad 150, and a microphone 160. Housing 110 may protect the components of device 100 from outside elements. Speaker 120 may provide audible information to a user of device 100. Display 130 may provide visual information to the user. For example, display 130 may provide information regarding incoming or outgoing calls, games, phone books, the current time, web content, etc. Control buttons 140 may permit the user to interact with device 100 to cause device 100 to perform one or more operations. Keypad 150 may include a standard telephone keypad. Microphone 160 may receive audible information from the user.

Figure 2:
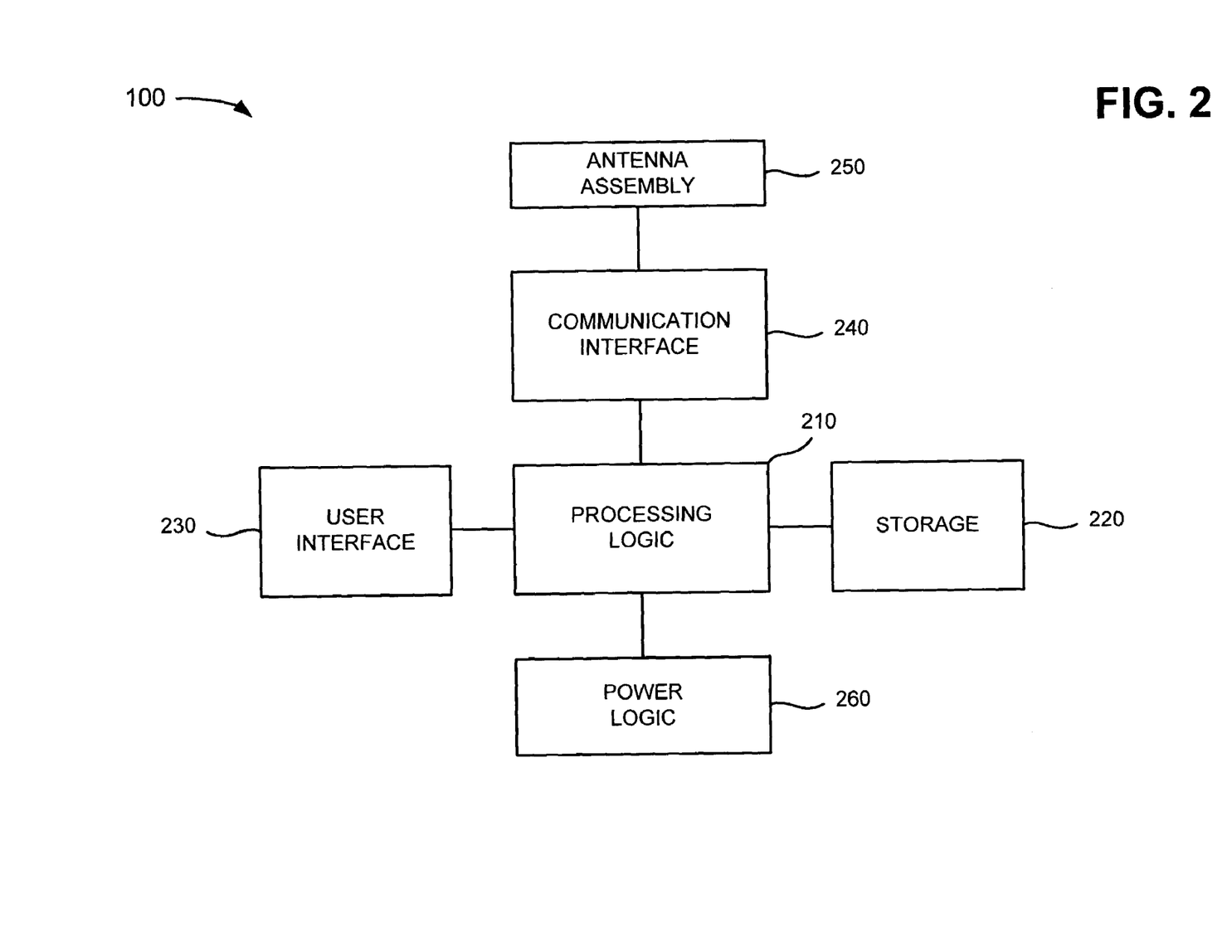
FIG. 2 is a diagram of exemplary components of the device of FIG. 1.

FIG. 2 is a diagram of exemplary components of mobile device 100. As shown in FIG. 2, device 100 may include processing logic 210, storage 220, user interface 230, communication interface 240, antenna assembly 250, and power logic 260. Processing logic 210 may include a processor, microprocessor, an application specific integrated circuit (ASIC), field programmable gate array (FPGA), or the like. Processing logic 210 may include data structures or software programs to control operation of device 100 and its components. Storage 220 may include a random access memory (RAM), a read only memory (ROM), and/or another type of memory to store data and instructions that may be used by processing logic 210.

User interface 230 may include mechanisms for inputting information to device 100 and/or for outputting information from device 100. Examples of input and output mechanisms might include a speaker (e.g., speaker 120) to receive electrical signals and output audio signals, a microphone (e.g., microphone 160) to receive audio signals and output electrical signals, buttons (e.g., control buttons 140 and/or keys of keypad 150) to permit data and control commands to be input into device 100, a display (e.g., display 130) to output visual information, and/or a vibrator to cause device 100 to vibrate.

Communication interface 240 may include, for example, a transmitter that may convert baseband signals from processing logic 210 to radio frequency (RF) signals and/or a receiver that may convert RF signals to baseband signals. Alternatively, communication interface 240 may include a transceiver to perform functions of both a transmitter and a receiver. Communication interface 240 may connect to antenna assembly 250 for transmission and reception of the RF signals. Antenna assembly 250 may include one or more antennas to transmit and receive RF signals over the air. Antenna assembly 250 may receive RF signals from communication interface 240 and transmit them over the air and receive RF signals over the air and provide them to communication interface 240.

Power logic 260 may provide power to device 100. In one implementation consistent with the principles of the invention, power logic 260 may be configured to control the charging of a rechargeable battery by cutting off the current supplied to the battery based on the temperature of the battery.

Figure 3:
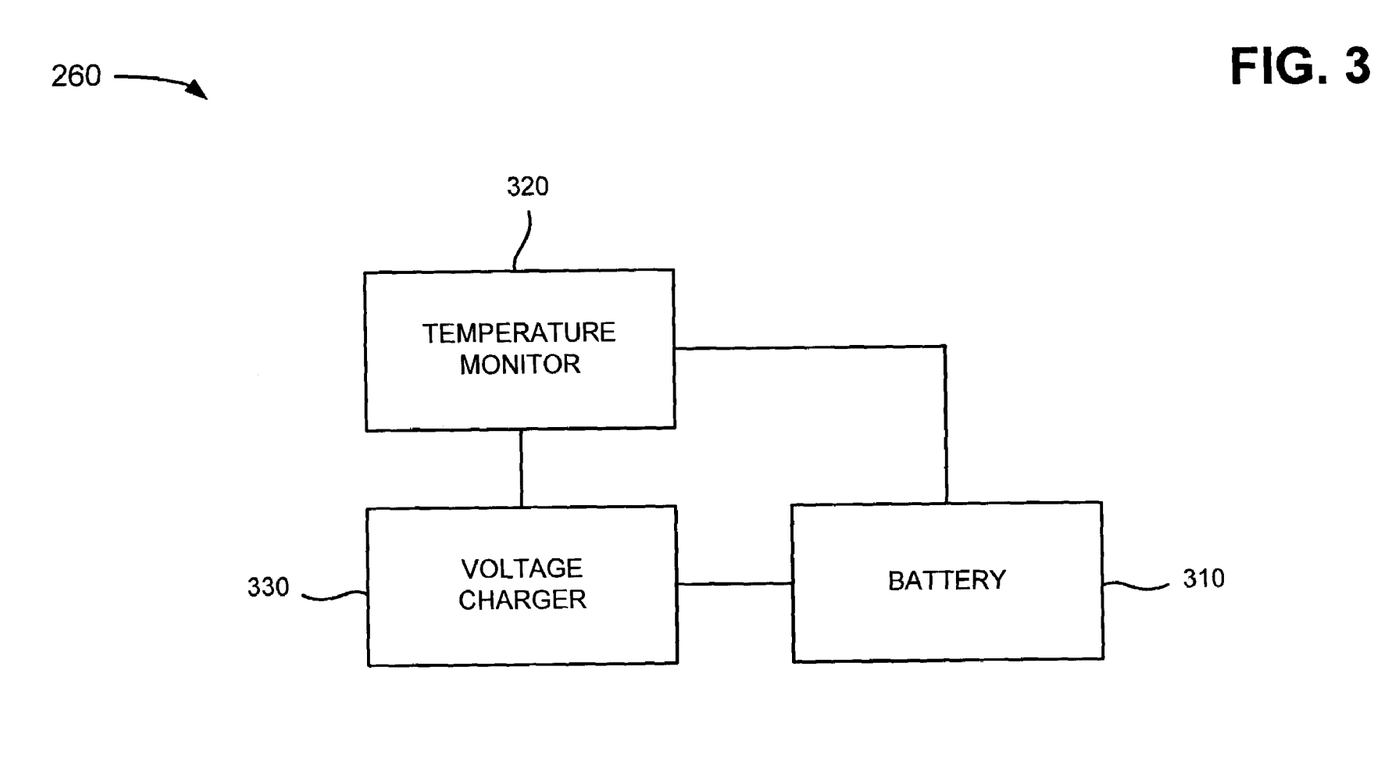
FIG. 3 is a diagram of exemplary components of the power logic of FIG. 2.

FIG. 3 is a diagram of exemplary components of power logic 260. As shown, power logic 260 may include a battery 310, temperature monitor 320, and voltage charger 330. Battery 310 may include a rechargeable battery, such as a lithium ion (Li-ion) battery, a lithium polymer (Li-poly) battery, or another type of rechargeable battery. Battery 310 may provide power for operation of device 100. Temperature monitor 320 may include a temperature sensor, such as a thermistor. Temperature monitor 320 may continuously (or periodically) monitor the temperature associated with battery 310. In one implementation, temperature monitor 320 may monitor the actual temperature of battery 310. In another implementation, temperature monitor 320 may monitor the temperature of a battery compartment housing battery 310.

Voltage charger 330 may control the charging of battery 310. In one implementation, voltage charger 330 may charge battery 310 using a technique that includes a constant current phase followed by a constant voltage phase. During the constant current phase, voltage charger 330 may supply a maximum charging current to battery 310. Alternatively, voltage charger 330 may supply less than a maximum charging current or a variable charging current to battery 310 during the constant current phase. Once the battery voltage reaches a predetermined level, the constant voltage phase may begin. During the constant voltage phase, the amount of charging current supplied to battery 310 may reduce to an amount necessary to maintain the battery voltage at the predetermined level.

Figure 4:
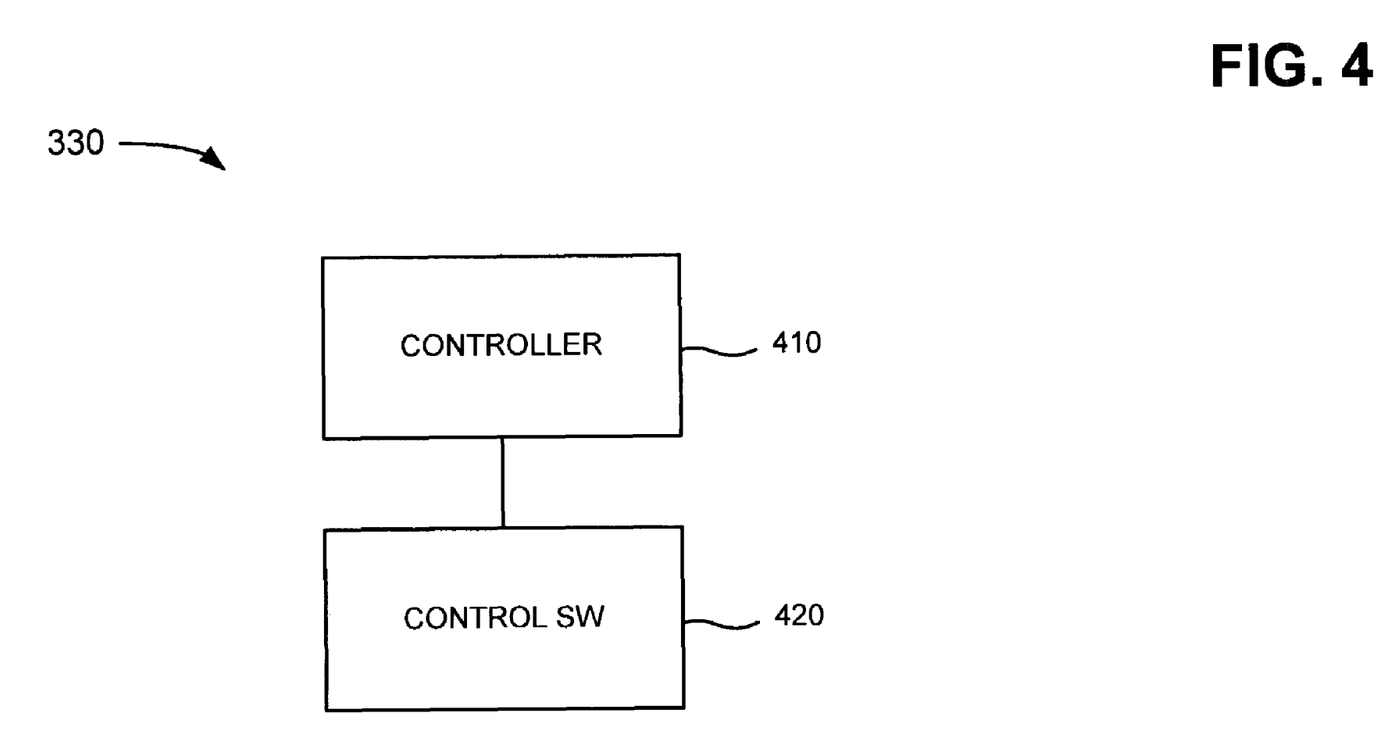
FIG. 4 is a diagram of exemplary functional elements of the voltage charger of FIG. 3.

FIG. 4 is a diagram of exemplary functional elements of voltage charger 330. As shown, voltage charger 330 may include a controller 410 and control software (SW) 420. Controller 410 may include an integrated circuit, or the like, to control current supplied to battery 310. Control software 420 may control the operation of controller 410 based on temperature information from temperature monitor 320. In one implementation, control software 420 may store a current cutoff parameter and a corresponding temperature parameter that indicate when to cut off the current to battery 310. For example, if the current cutoff parameter is set to 200 mA and the temperature parameter is set to 45° C., then controller 410 may cut off the current to battery 310 at 200 mA when the temperature is around 45° C. By cutting off the current at the set current cutoff parameter and temperature parameter, controller 410 may less than fully charge battery 310 at high temperatures, thereby improving the performance of battery 310. As explained above, the performance of a battery degrades when it is fully (or near fully) charged at high temperatures. Also, by monitoring the temperature associated with battery 310, it may be possible to retain the charge of battery 310 longer at lower temperatures.

The particular current cutoff parameter and temperature parameter set in control software 420 may be programmable (factory programmed or possibly user programmed) based on one or more factors associated with battery 310. For example, one set of current cutoff and temperature parameters may be provided for Li-ion batteries and another set of parameters may be provided for Li-poly batteries. Alternatively, or additionally, a set of parameters may be provided for different manufacturers of Li-ion and/or Li-poly batteries. These parameters may be programmed into device 100 and set in control software 420, as necessary. The parameters may be set to maximize performance of battery 310 and, thus, minimize performance degradation of battery 310 caused by charging of battery 310.

In one implementation, device 100 (e.g., processing logic 210) may automatically determine the type of battery 310 (e.g., Li-ion or Li-poly) and/or the manufacturer of battery 310 provided within power logic 260. Device 100 may then program the appropriate current cutoff and temperature parameters within control software 420.

In another implementation, device 100 (e.g., processing logic 210) may determine the type of battery 310 and/or the manufacturer of battery 310 provided within power logic 260 via user input. For example, device 100 may provide a user interface to a user of device 100 to permit the user to identify the type and/or manufacturer of battery 310. Device 100 may then program the appropriate current cutoff and temperature parameters within control software 420.

The number of current cutoff and temperature parameters programmed into device 100 (per battery type, manufacturer, etc.) may vary. In one implementation, device 100 may be programmed with a single set of current cutoff and temperature parameters. In another implementation, device 100 may be programmed with two or more sets of current cutoff and temperature parameters.

Figure 5:
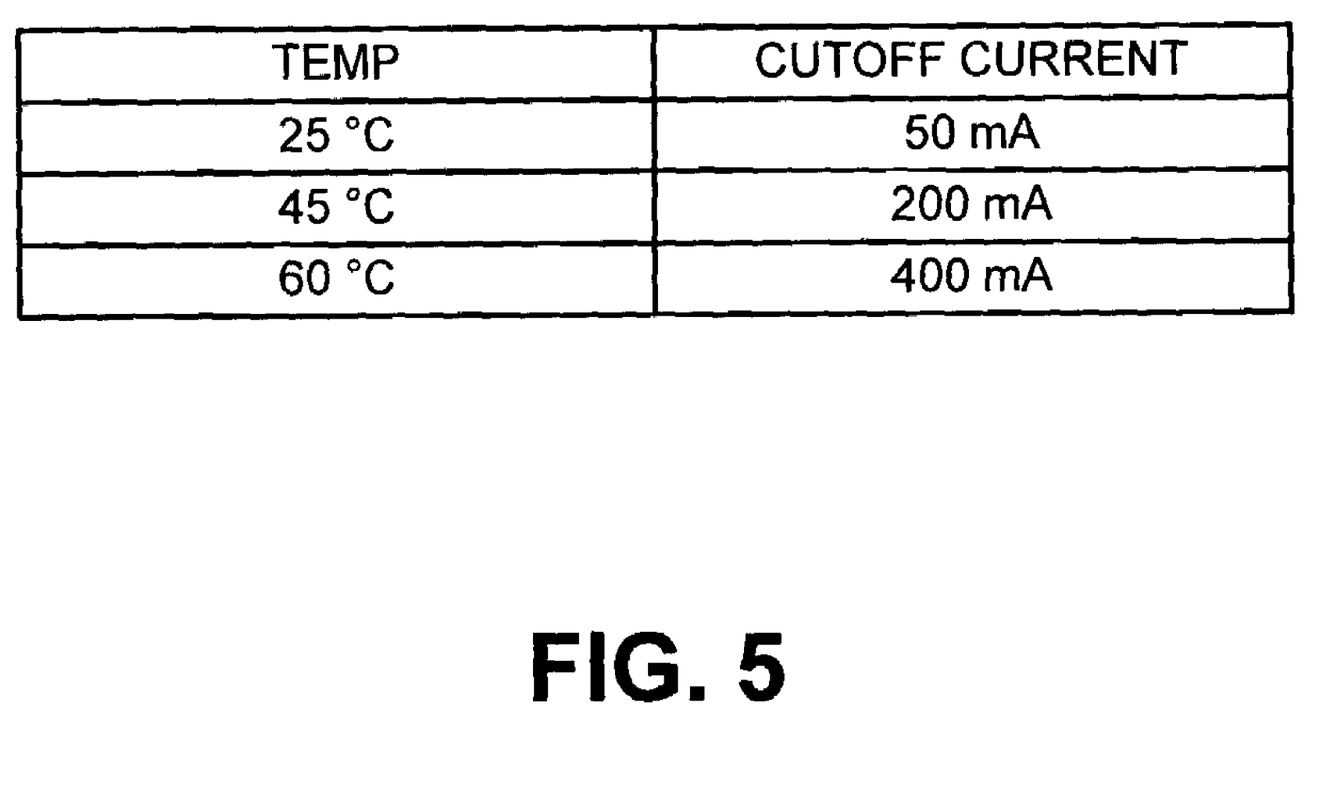
FIG. 5 is a diagram of an exemplary table that may be used by the voltage charger of FIG. 3.

FIG. 5 is a diagram of an exemplary table that may be programmed into device 100. As shown in FIG. 5, a first set of parameters might indicate a cutoff current of 50 mA at 25° C., a second set of parameters might indicate a cutoff current of 200 mA at 45° C., and a third set of parameters might indicate a cutoff current of 400 mA at 60° C. While a single table is shown in FIG. 5, device 100 may store multiple tables that stores sets of parameters for different types of batteries, different battery manufacturers, etc.

Figure 6:
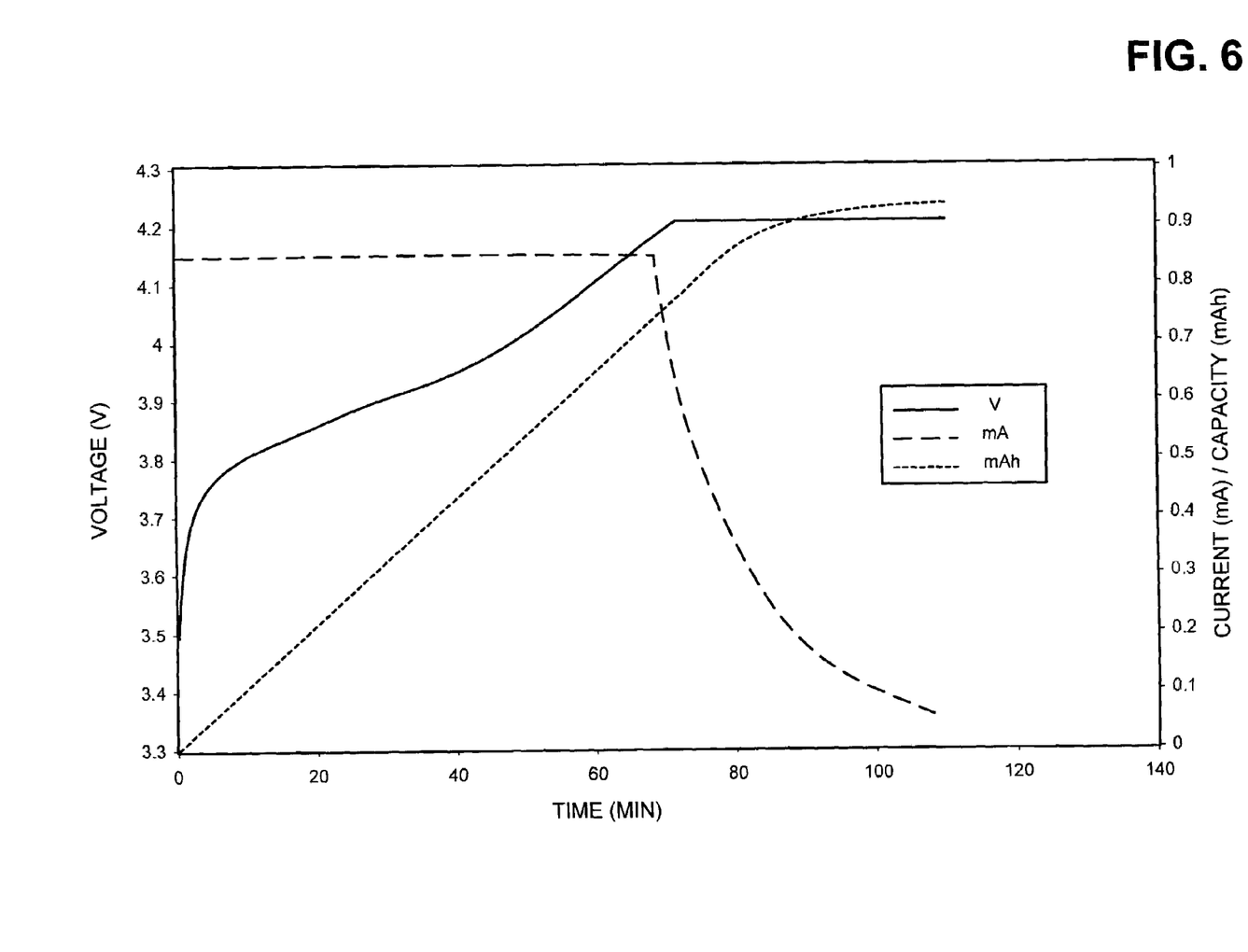
FIGS. 6-8 are exemplary graphs showing charging voltage, current, and capacity over time for different cutoff current and temperature parameters.
Figure 7:
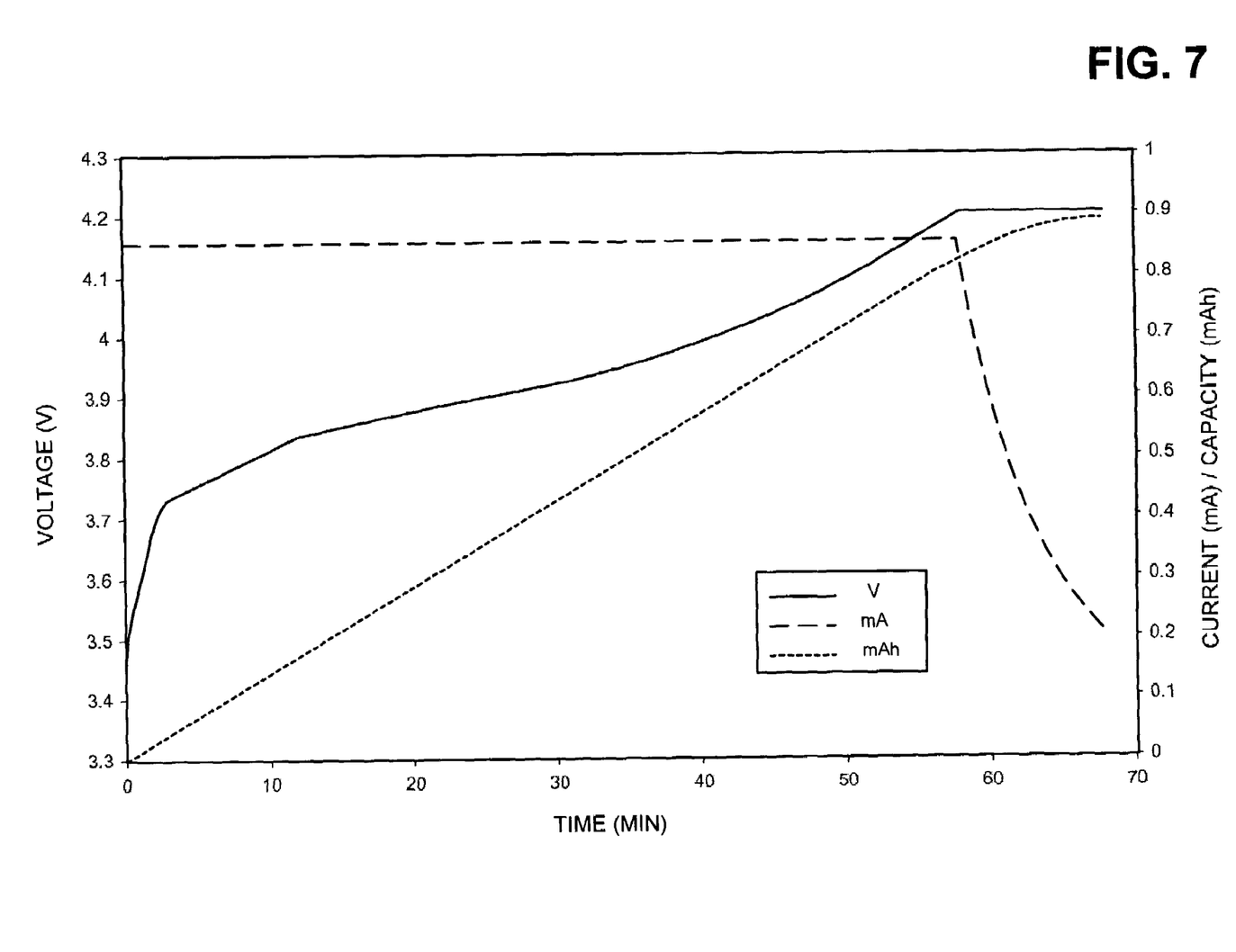
Figure 8:
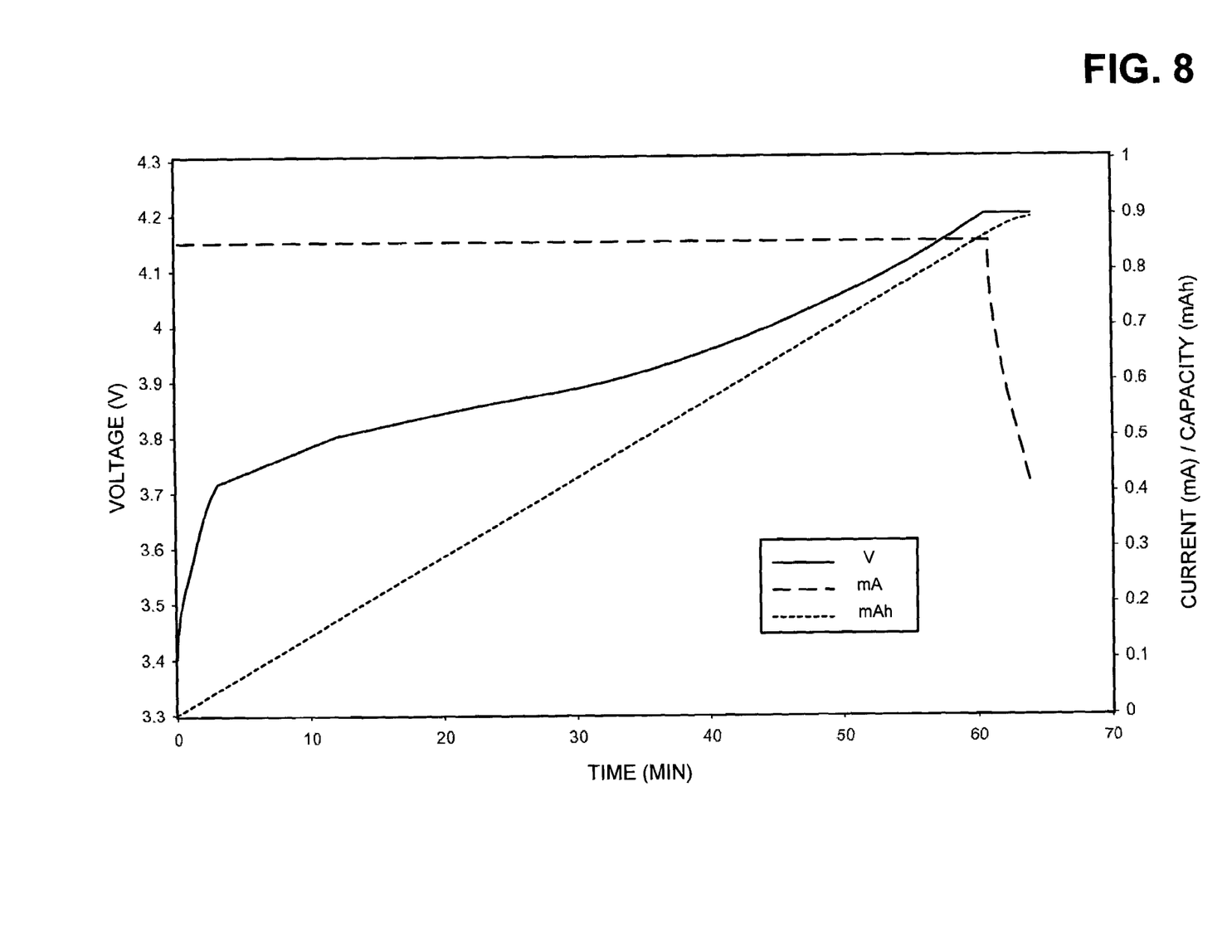

FIGS. 6-8 are exemplary graphs showing charging voltage, current, and capacity over time for a particular type of battery and the different cutoff current and temperature parameters shown in FIG. 5. FIG. 6 is a graph of battery charging at a temperature of 25° C. and a current cutoff of 50 mA. As shown in FIG. 6, a constant current of approximately 850 mA may be supplied to the battery until a battery voltage of approximately 4.2 V is achieved. At this point, the current may reduce to an amount necessary to maintain the battery voltage at 4.2 V. When the current reaches 50 mA (i.e., the current cutoff parameter value), the current may be cut off. As shown in FIG. 6, the battery may be charged to a capacity of approximately 930 mAh when the current cutoff parameter value is reached.

FIG. 7 is a graph of battery charging at a temperature of 45° C. and a current cutoff of 200 mA. As shown in FIG. 7, a constant current of approximately 850 mA may be supplied to the battery until a battery voltage of approximately 4.2 V is achieved. At this point, the current may reduce to an amount necessary to maintain the battery voltage at 4.2 V. When the current reaches 200 mA (i.e., the current cutoff parameter value), the current may be cut off. As shown in FIG. 7, the battery may be charged to a capacity of approximately 900 mAh when the current cutoff parameter value is reached. In this case, the battery is less than fully charged, which may reduce performance degradation of the battery.

FIG. 8 is a graph of battery charging at a temperature of 60° C. and a current cutoff of 400 mA. As shown in FIG. 8, a constant current of approximately 850 mA may be supplied to the battery until a battery voltage of approximately 4.2 V is achieved. At this point, the current may reduce to an amount necessary to maintain the battery voltage at 4.2 V. When the current reaches 400 mA (i.e., the current cutoff parameter value), the current may be cut off. As shown in FIG. 8, the battery may be charged to a capacity of approximately 900 mAh when the current cutoff parameter value is reached. In this case, the battery is less than fully charged, which may reduce performance degradation of the battery.

The graphs of FIGS. 6-8 illustrate examples where the current cutoff parameter value occurs in the constant voltage phase. It should be understood, that the current cutoff parameter value can also occur in the constant current phase. Also, it may be possible to vary the current supplied during the constant voltage phase to permit the performance of the battery to be optimized.

Exemplary Processing

Figure 9:
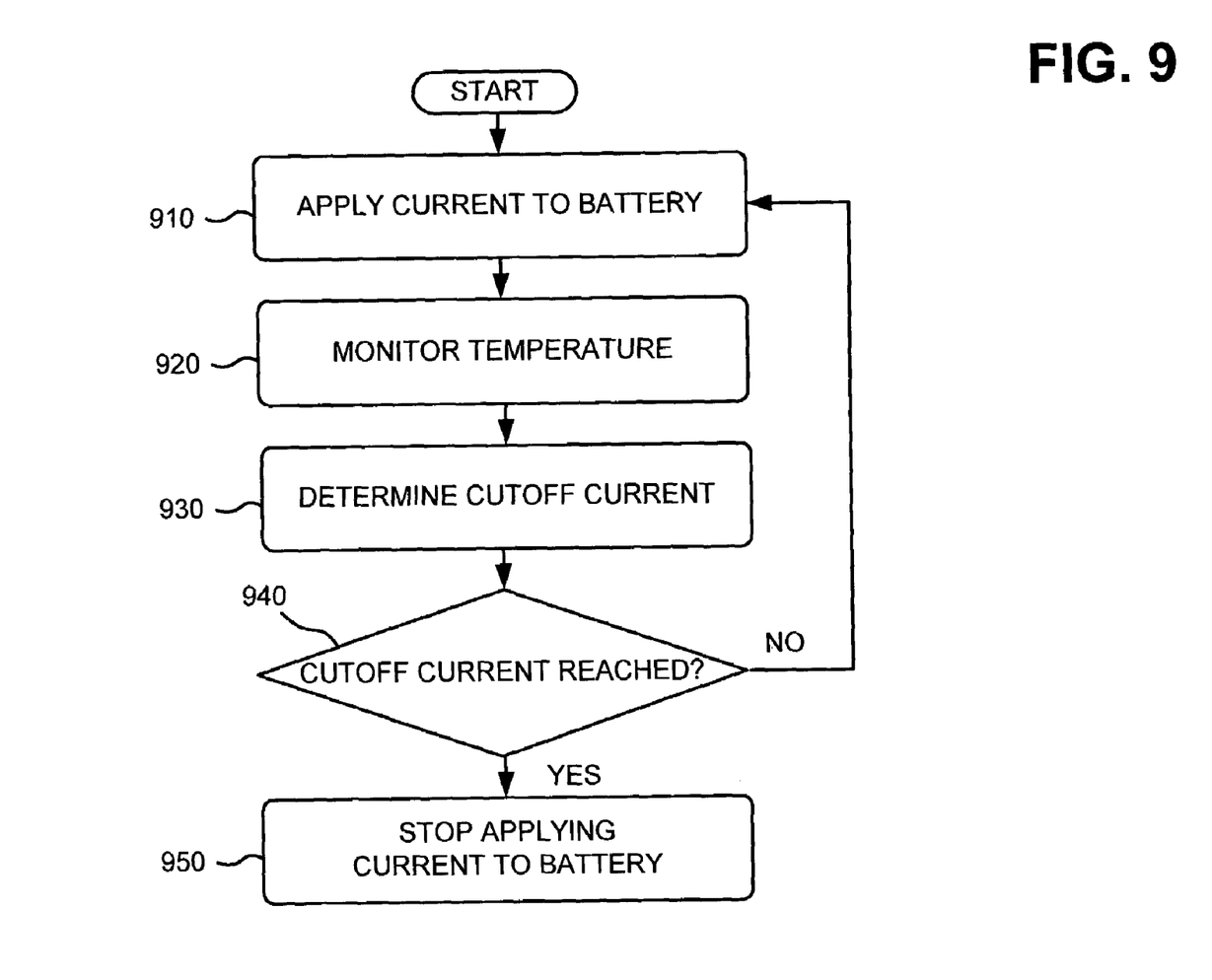
FIG. 9 is a flowchart of exemplary processing for charging a battery according to an implementation consistent with the principles of the invention.

FIG. 9 is a flowchart of exemplary processing for charging a battery according to an implementation consistent with the principles of the invention. Processing may begin with a current being supplied to a battery, such as battery 310 (block 910). In one implementation, as explained above, a constant (or variable) current may be supplied to battery 310 until a predetermined battery voltage is reached. Then, the amount of current supplied to battery 310 may reduce to an amount necessary to maintain battery 310 at the predetermined battery voltage.

During charging of battery 310, the temperature associated with battery 310 may be monitored (block 920). For example, temperature monitor 320 may continuously (or periodically)

monitor the temperature of battery 310. Temperature monitor 320 may provide information regarding the temperature to voltage charger 330.

A current cutoff parameter may be determined (block 930). Voltage charger 330 may determine an applicable current cutoff parameter based on the temperature information. For example, voltage charger 330 may compare the temperature information to the temperature parameters associated with the one or more sets of current cutoff and temperature parameters set in voltage charger 330. In one implementation, voltage charger 330 may identify the appropriate set of current cutoff and temperature parameters as the set of current cutoff and temperature parameters whose temperature parameter most closely matches (without exceeding) the temperature information. With reference to FIG. 5, voltage charger 330 may select a current cutoff parameter of 200 mA for temperatures ranging from 30° C. to 49° C. and/or a current cutoff parameter of 400 mA for temperatures of 50° C. or greater. In another implementation, a matching temperature parameter may be identified in another way (i.e., not necessarily most closely matching without exceeding).

It may be determined whether the cutoff current has been reached (block 940). For example, voltage charger 330 may determine whether the current being supplied to battery 310 reaches a value corresponding to the current cutoff parameter. If the cutoff current has not been reached (block 940-NO), then current may continue to be supplied to battery 310 (block 910). If the cutoff current has been reached (block 940-YES), then the current may be cut off (block 950). For example, voltage charger 330 may stop supplying current to battery 310 when the cutoff current has been reached. By cutting off the current like this, voltage charger 330 may less than fully charge battery 310 and, thus, preserve the performance of battery 310 during high temperature situations.

CONCLUSION

Implementations consistent with principles of the invention may maximize the performance of a rechargeable battery by cutting off the current supplied during charging of the battery when the temperature associated with the battery exceeds a programmable threshold.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, while a series of acts has been described with regard to FIG. 9, the order of the acts may be modified in other implementations consistent with the principles of the invention. Further, non-dependent acts may be performed in parallel.

It should be emphasized that the term "comprises" or "comprising" when used in the specification is taken to specify the presence of stated features, integers, steps, or components but does not preclude the presence or addition of one or more other features, integers, steps, components, or groups thereof.

Further, certain portions of the invention have been described as "logic" that performs one or more functions. This logic may include hardware, such as an application specific integrated circuit or a field programmable gate array, software, or a combination of hardware and software.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device, comprising:
   a memory to store a plurality of tables, each of the table including a plurality of entries, each of the entries storing a temperature parameter and a current cutoff parameter, each of the tables corresponding to a different battery type and a different battery manufacturer;
   processing logic to:
      determine a battery type and a battery manufacturer associated with a rechargeable battery provided within the device, and
      select one of the tables based on the determined battery type and the determined battery manufacturer associated with the battery;
   a temperature monitor to determine a temperature associated with the battery; and
   a charger to:
      determine a current cutoff parameter from the selected table based on the determined temperature,
      supply current to the battery,
      determine when the supplied current reaches a value corresponding to the current cutoff parameter, and
      cease further supply of the supplied current to the battery when the supplied current reaches the value corresponding to the current cutoff parameter.

2. The device of claim 1, where the temperature monitor includes a thermistor.

3. The device of claim 1, where when determining a current cutoff parameter, the charger is configured to:
   match the determined temperature to the temperature parameter associated with one of the entries in the selected table, and
   identify the current cutoff parameter that corresponds to the temperature parameter in the one of the entries.

4. The device of claim 1, where the battery is less than fully charged when further supply of the supplied current is ceased.

5. The device of claim 1, where the battery includes a lithium ion battery or a lithium polymer battery.

6. A method for charging a rechargeable battery, comprising:
   storing a plurality of tables, each of the tables including a plurality of entries, each of the entries storing a temperature parameter and a current cutoff parameter, each of the tables corresponding to a different battery type and a different battery manufacturer;
   determining a battery type and a battery manufacturer associated with the battery;
   selecting one of the tables based on the determined battery type and the determined battery manufacturer associated with the battery;
   supplying a current to the battery to charge the battery;

determining a temperature associated with the battery;
identifying a cutoff parameter in the selected table based on the determined temperature;
determining when the supplied current matches a value corresponding to the cutoff parameter; and
stopping further supply of the supplied current to the battery when the supplied current matches the value corresponding to the current cutoff parameter.

7. The method of claim 6 where identifying a cutoff parameter includes:
matching the determined temperature to the temperature parameter associated with one of the entries in the selected table, and
determining the cutoff parameter as the current cutoff parameter that corresponds to the temperature parameter in the one of the entries.

8. The method of claim 6, where stopping further supply of the supplied current to the battery includes:
ceasing further supply of the supplied current before the battery is fully charged.

9. A device, comprising:
means for storing a plurality of tables, each of the tables including a plurality of sets of temperature parameters and current cutoff parameters, each of the sets including one of the temperature parameters and a corresponding one of the current cutoff parameters, each of the tables corresponding to a different battery manufacturer;
means for determining a battery manufacturer associated with a battery provided within the device;
means for selecting one of the tables based on the determined battery manufacturer associated with the battery;
means for determining a temperature associated with the battery;
means for comparing the determined temperature to the temperature parameters in the selected table to identify one of the temperature parameters;
means for identifying the current cutoff parameter corresponding to the identified temperature parameter;
means for supplying current to the battery;
means for determining when the supplied current matches the identified current cutoff parameter; and
means for stopping further supply of the supplied current to the battery when the supplied current matches the identified current cutoff parameter.

10. The device of claim 1, where the processing logic is configured to automatically determine the battery type and the battery manufacturer associated with the battery.

11. The device of claim 1, where the processing logic is configured to:
receive user input that identifies the battery type and the battery manufacturer associated with the battery, and
select one of the tables based on the user input.

12. The device of claim 3, where the battery is less than fully charged when further supply of the supplied current is ceased.

13. The method of claim 6, where determining the battery type and the battery manufacturer associated with the battery includes automatically determining the battery type and the battery manufacturer associated with the battery.

14. The method of claim 6, where determining the battery type and the battery manufacturer associated with the battery includes receiving user input that identifies the battery type and the battery manufacturer associated with the battery; and
where selecting one of the tables based on the determined battery type and the determined battery manufacturer associated with the battery includes selecting one of the tables based on the user input.

15. The method of claim 7, where stopping further supply of the supplied current to the battery includes:
ceasing further supply of the supplied current before the battery is fully charged.

16. The device of claim 9, where each of the tables corresponds to a different battery type and a different battery manufacturer.

17. The device of claim 14, further comprising:
means for determining a battery type associated with the battery.

18. The device of claim 15, where the means for selecting one of the tables includes means for selecting one of the tables based on the determined battery type and the determined battery manufacturer.

19. The device of claim 9, where the means for stopping further supply of the supplied current to the battery includes:
means for ceasing further supply of the supplied current before the battery is fully charged.

* * * * *